US012798673B2

(12) United States Patent
Smith

(10) Patent No.: US 12,798,673 B2
(45) Date of Patent: Nov. 17, 2026

(54) STEERING SYSTEM FOR AN ARTICULATED MACHINE

(71) Applicant: Caterpillar Inc., Peoria, IL (US)

(72) Inventor: Mark Andrew Smith, County Durham (GB)

(73) Assignee: Caterpillar Inc., Peoria, IL (US)

( * ) Notice: Subject to any disclaimer, the term of this patent is extended or adjusted under 35 U.S.C. 154(b) by 324 days.

(21) Appl. No.: 18/589,642

(22) Filed: Feb. 28, 2024

(65) Prior Publication Data

US 2024/0326908 A1 Oct. 3, 2024

(30) Foreign Application Priority Data

Mar. 27, 2023 (GB) ..................................... 2304426

(51) Int. Cl.
*B62D 11/02* (2006.01)
*B62D 11/04* (2006.01)
*B62D 12/00* (2006.01)

(52) U.S. Cl.
CPC .............. *B62D 12/00* (2013.01); *B62D 11/04* (2013.01)

(58) Field of Classification Search
CPC .......... B62D 11/02; B62D 12/00; B62D 11/04
See application file for complete search history.

(56) References Cited

U.S. PATENT DOCUMENTS 4,974,956 A 12/1990 Gill
6,283,237 B1 9/2001 Muller
7,440,834 B2 10/2008 Yamaguchi et al.
2001/0018991 A1 9/2001 Venturi et al.
2008/0314675 A1 12/2008 Nozaki et al.
2012/0072076 A1* 3/2012 Gustavsson ........... B60W 10/16 903/902
2012/0221222 A1* 8/2012 Anderson ............. B60W 40/10 701/1
2012/0241229 A1* 9/2012 Niva ........................ B60K 6/46 180/14.2
2017/0327000 A1 11/2017 Wada et al.

(Continued)

FOREIGN PATENT DOCUMENTS

CN 102874304 A 1/2013
CN 205131366 U 4/2016

(Continued)

OTHER PUBLICATIONS

Great Britain Search Report related to Application No. GB2304426.6; reported on Sep. 13, 2023.

*Primary Examiner* — Long T Tran

(57) ABSTRACT

An articulated machine is described. The articulated machine includes a leading frame portion and a trailing frame portion, each defining a first side and a second side. The articulated machine includes at least one first traction device provided on the first side, and at least one second traction device provided on the second side of the leading frame portion and the trailing frame portion. The articulated machine includes a system to selectively steer the articulated machine towards a first side direction and a second side direction. The system includes a controller to receive a steering input and alter motion parameter of one of the at least one first traction device and the at least one second traction device with respect to the other to turn one of the leading frame portion and the trailing frame portion with respect to the other.

12 Claims, 6 Drawing Sheets

(56) References Cited

U.S. PATENT DOCUMENTS

| | | | | |
|---|---|---|---|---|
| 2018/0099660 | A1 * | 4/2018 | Weigert | B60W 30/06 |
| 2020/0290672 | A1 * | 9/2020 | Teranishi | E02F 9/2004 |
| 2021/0188240 | A1 * | 6/2021 | Wolff | A01B 69/004 |
| 2022/0097704 | A1 | 3/2022 | Collins | |
| 2022/0097764 | A1 * | 3/2022 | Hickey | B62D 12/00 |

FOREIGN PATENT DOCUMENTS

| | | | |
|---|---|---|---|
| CN | 112519876 | A | 3/2021 |
| DE | 102011087073 | A1 | 12/2012 |

* cited by examiner

STEERING SYSTEM FOR AN ARTICULATED MACHINE

CROSS-REFERENCE TO RELATED APPLICATION

This application claims priority under 35 USC $119 and the Paris Convention Britain Patent Application 2304426.6 filed on Mar. 27, 2023.

TECHNICAL FIELD

The present disclosure relates to an articulated machine having a steering system. More particularly, the present disclosure relates to varying motion parameters of the articulated machine's traction devices to steer the articulated machine.

BACKGROUND

An articulated work machine, such as a scraper, a wheel loader, and an articulated truck, generally includes a front frame structure and a rear frame structure that may pivot in relation to each other to steer the machine. Typically, actuators, such as hydraulic actuators, are applied in such machines to move the front frame structure and the rear frame structure with respect to each other to enable steering of the articulated machine.

Chinese Publication No. 102874304A relates to a four-wheel independent on-line steering system with multiple steering modes applied to electric vehicles, such as, cars.

SUMMARY

In an aspect, the present disclosure relates to an articulated machine. The articulated machine includes a leading frame portion and a trailing frame portion pivotably coupled to each other. Each of the leading frame portion and the trailing frame portion defines a first side and a second side opposite to the first side. The articulated machine further includes at least one first traction device provided on the first side of each of the leading frame portion and the trailing frame portion, and at least one second traction device provided on the second side of each of the leading frame portion and the trailing frame portion. The articulated machine further includes a system to selectively steer the articulated machine towards a first side direction and a second side direction. The system includes a controller configured to receive a steering input and for at least one of the leading frame portion and the trailing frame portion, alter a motion parameter of one of the at least one first traction device and the at least one second traction device with respect to the other of the at least one first traction device and the at least one second traction device, to turn one of the leading frame portion and the trailing frame portion with respect to the other of the leading frame portion and the trailing frame portion.

BRIEF DESCRIPTION

DETAILED DESCRIPTION

Reference will now be made in detail to specific embodiments or features, examples of which are illustrated in the accompanying drawings. Wherever possible, the same reference numbers will be used throughout the drawings to refer to the same or the like parts.

Figure 1:
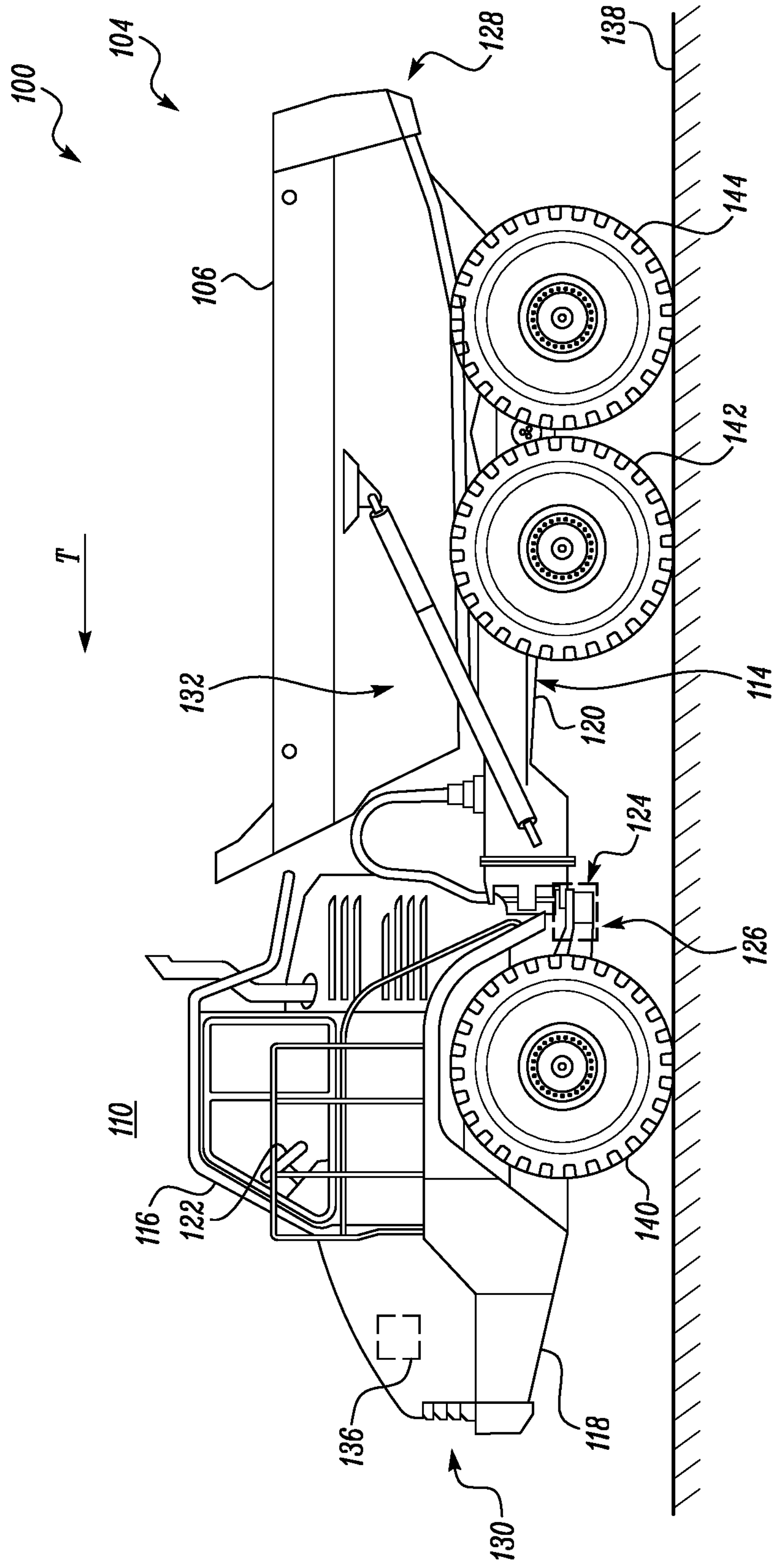
FIG. 1 is a side view of an exemplary articulated machine having a system for steering the articulated machine, in accordance with an embodiment of the present disclosure.

Referring to FIG. 1, an exemplary machine 100 is shown. The machine 100 may be an articulated machine, for example, an articulated dump truck 104. The articulated dump truck 104 may have a dump body 106 within which a payload (not shown) may be received for haulage and transfer to a location of the worksite 110. Examples of the worksite 110 may include a construction site, a mine site, a landfill, a quarry, an underground mine site, and the like. The machine 100 may be configured to move back and forth and also steer in different directions (e.g., relatively left and right directions) during operations at the worksite 110. Said movement and steering enables the machine 100 to transfer the payload from one location to another location. Although, the machine 100 is illustrated as an articulated dump truck 104 in FIG. 1, it will be understood that the aspects of the present disclosure may be applied to several other articulated machines, such as, articulated wheel loaders, and the like machines.

The machine 100 may include a frame 114. The frame 114 may include a split frame configuration that defines a leading frame portion 118 and a trailing frame portion 120. As an example, and among other parts and sub-systems, the leading frame portion 118 may support an operator cab 116 that houses various parts and systems, including a steering input device 122 for controlling a direction of movement of the machine 100. In some embodiments, for example, in the case of autonomous machine, the steering input device 122 may be positioned external to the machine 100, as shown in FIGS. 3 through 6. The trailing frame portion 120, among other parts and sub-systems, may support the dump body 106 of the machine 100. The machine 100 may also include a system 200 to selectively steer the machine 100 in different directions (e.g., left and/or right directions). The details of the system 200 will be described in detail with reference to FIGS. 2-6.

The leading frame portion 118 and the trailing frame portion 120 may be pivotably coupled to each other by way of a hitch system 124 disposed at a hitch location 126. As an example, the hitch system 124 may be disposed in between the leading frame portion 118 and the trailing frame portion 120. By way of the hitch system 124, the leading frame portion 118 may pivot or articulate relative to the trailing frame portion 120, during machine movement, facilitating a steering of the machine 100 during machine movement.

It may be noted that the terms 'leading' and 'trailing', as used herein, are in relation to an exemplary direction of travel of the machine 100, as represented by arrow, T, in FIG. 1. Said direction of travel, T, may be the direction in which the machine 100 may generally travel so as to move or shuttle between different locations of the worksite 110. Said direction of travel, T, may be exemplarily defined from a rearward end 128 of the machine 100 towards a forward end 130 of the machine 100. Further, terms such as 'left' and 'right', as used in the present disclosure, may be understood as the machine 100 is viewed from the trailing frame portion

120 towards the leading frame portion 118 and/or from the rearward end 128 towards the forward end 130.

Each of the leading frame portion 118 and the trailing frame portion 120 define a first side 132 and a second side 134 (shown in FIGS. 3 through 6) opposite to the first side 132 of the machine 100. The first side 132 may correspond to the left side of the machine 100 and the second side 134 may correspond to the right side of the machine 100 when viewing the machine 100 from the rearward end 128 towards the forward end 130.

Figure 5:
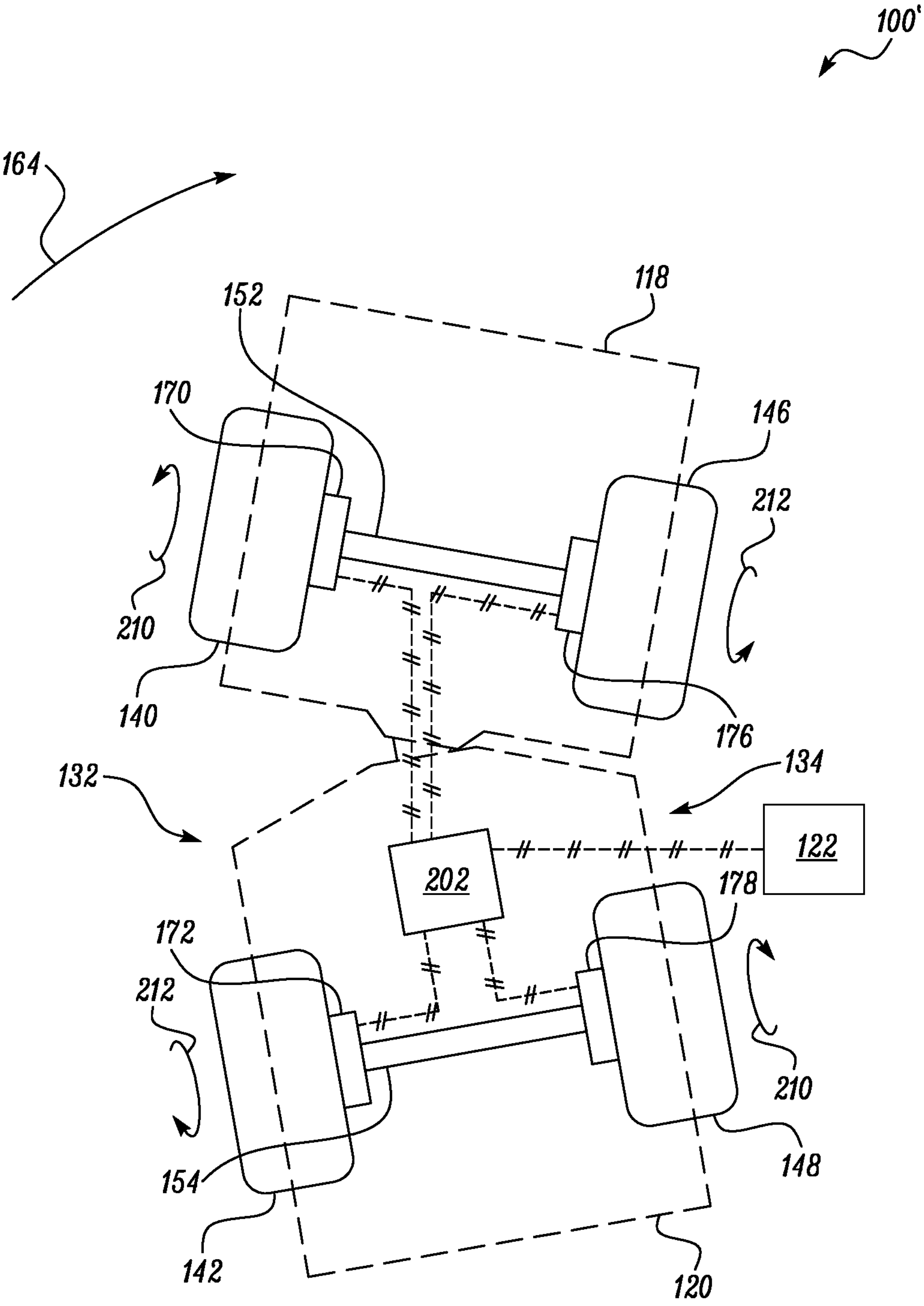
Figure 6:
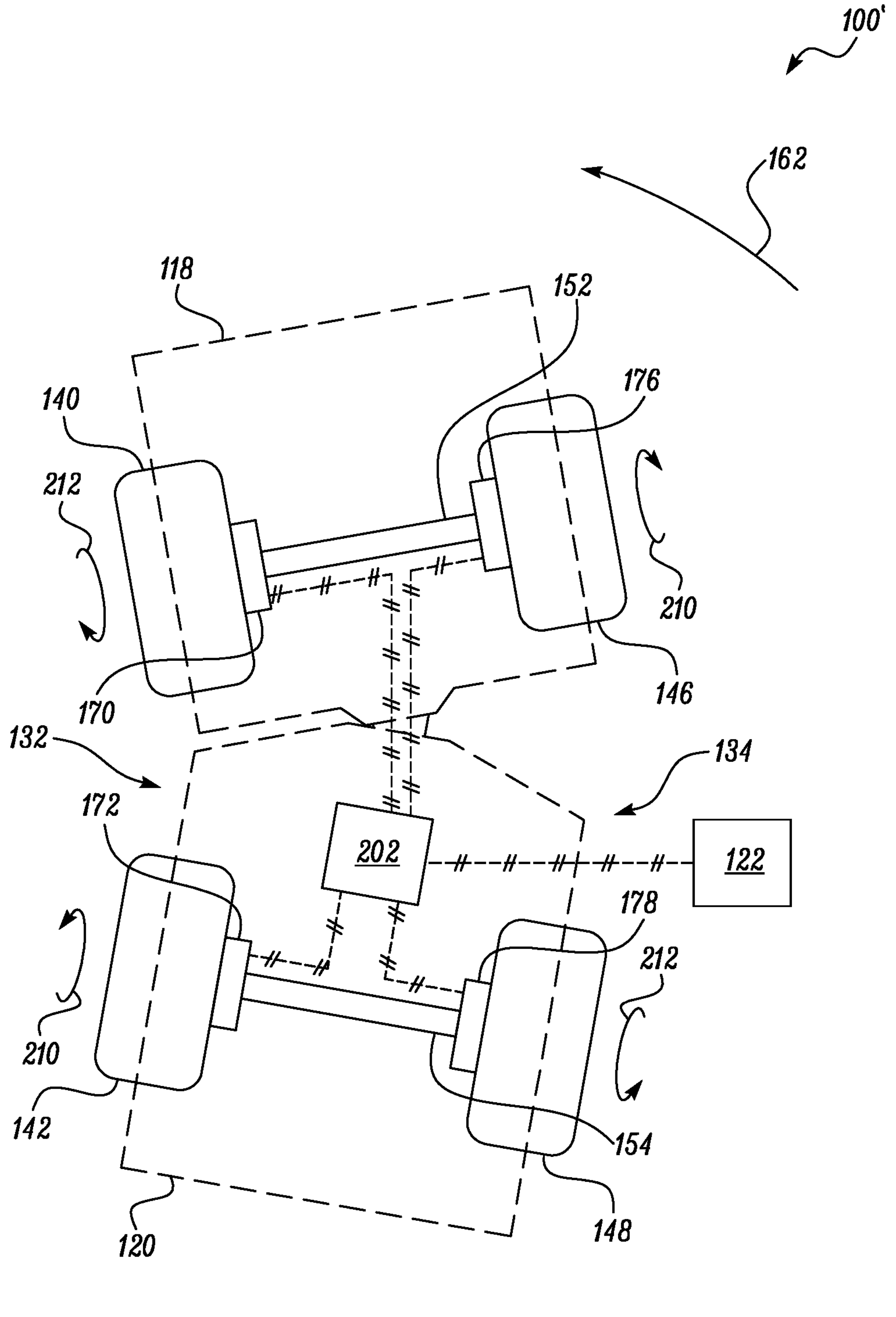

At least one first traction device is provided on the first side 132 of each of the leading frame portion 118 and the trailing frame portion 120. For example, as shown in FIG. 1, a first traction device 140 is provided on the first side 132 of the leading frame portion 118 and first traction devices 142, 144 are provided on the first side 132 of the trailing frame portion 120. In some cases, depending upon the type of machine 100, only one first traction device 142 may be provided on the first side 132 of the trailing frame portion 120. For example, as shown in FIGS. 5 and 6, only one first traction device 142 is provided on the first side 132 of the trailing frame portion 120 of the machine 100'.

Figure 3:
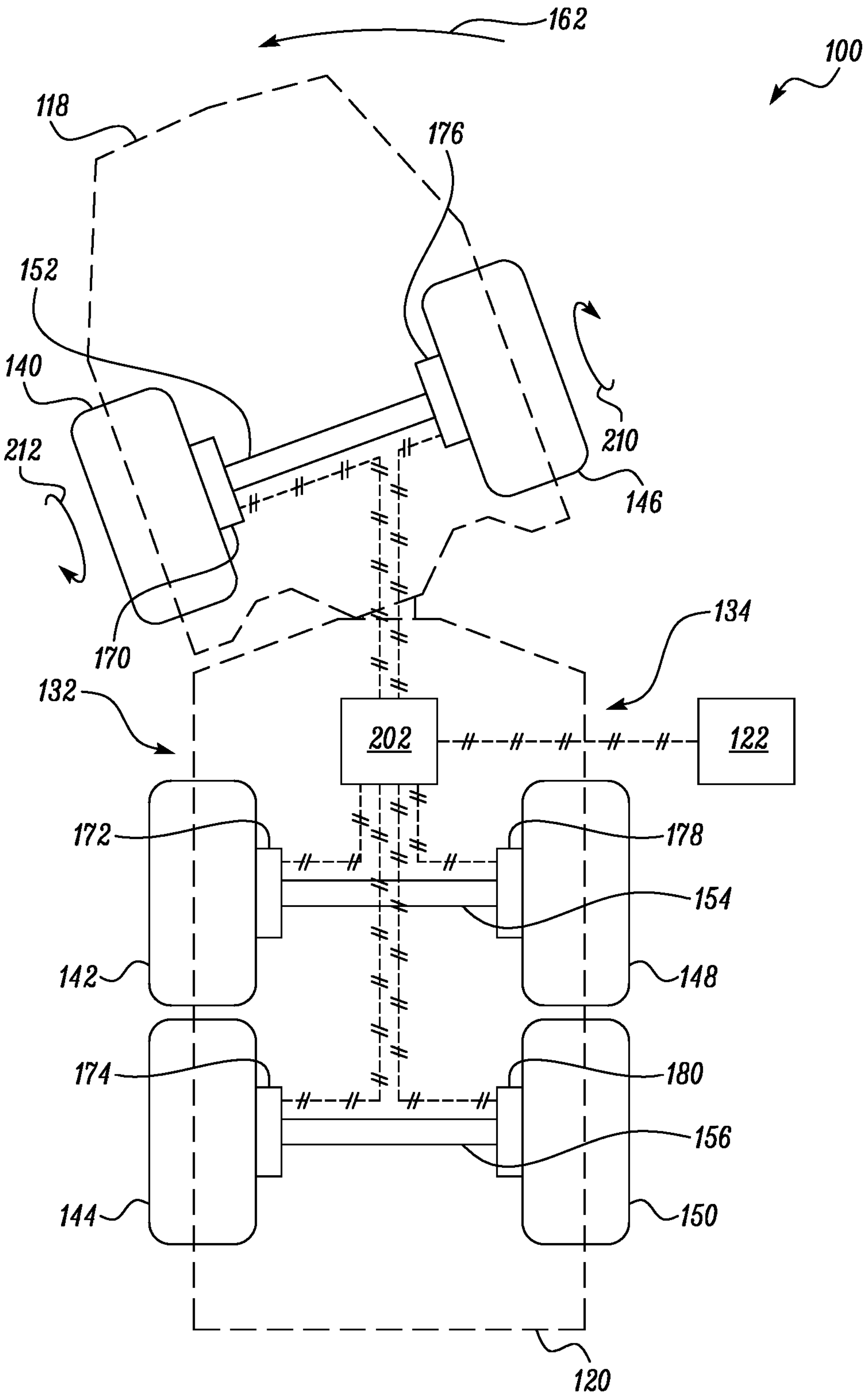
FIGS. 3 through 6 are various views illustrating various methods by which a steering of the articulated machine in the different steering directions may be attained, in accordance with an embodiment of the present disclosure.
Figure 4:
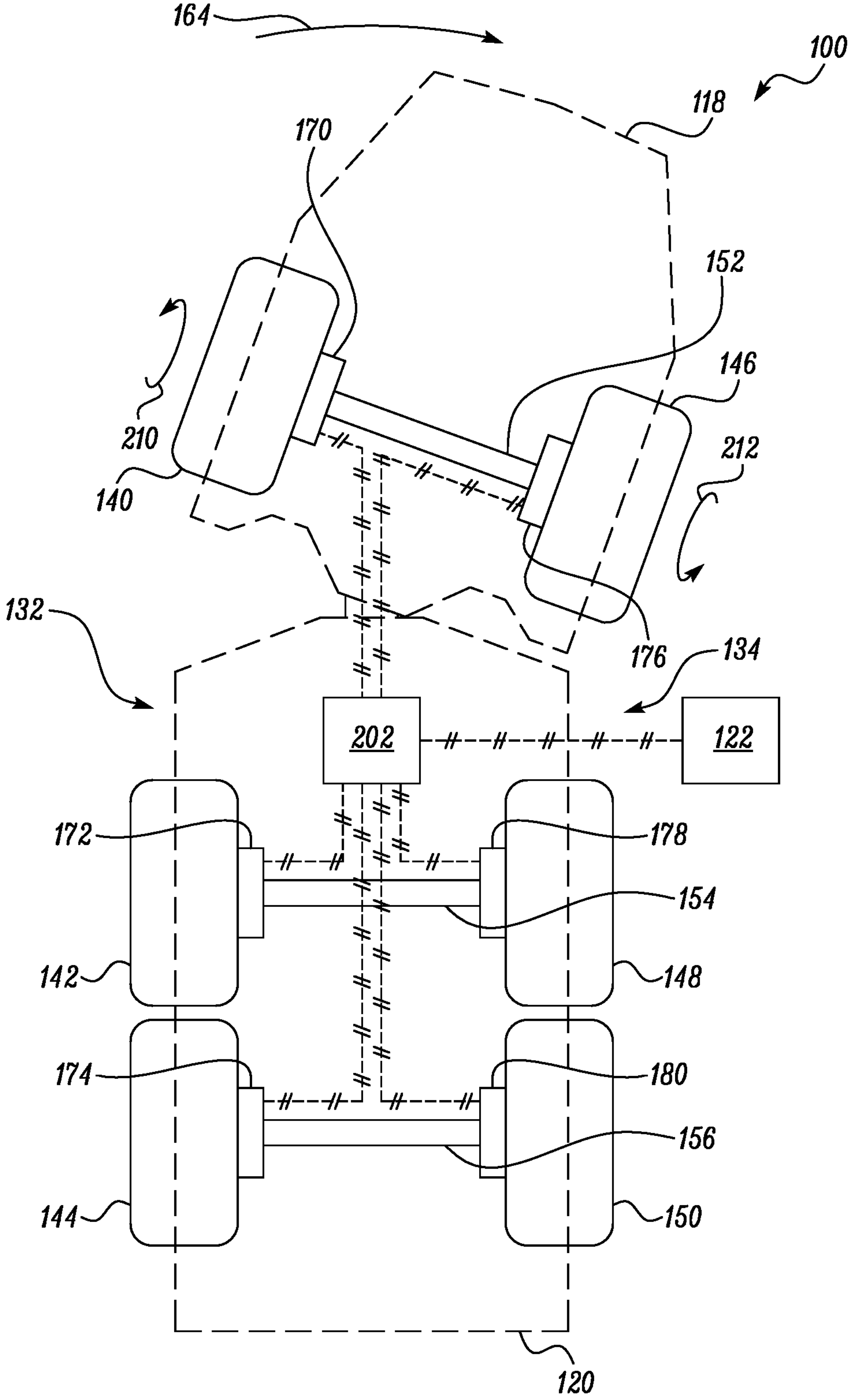

Similarly, at least one second traction device is provided on the second side 134 (shown in FIGS. 3 through 6) of each of the leading frame portion 118 and the trailing frame portion 120. For example, as shown in FIGS. 3 and 4, a second traction device 146 is provided on the second side 134 of the leading frame portion 118 and second traction devices 148, 150 are provided on the second side 134 of the trailing frame portion 120. In some cases, depending upon the type of machine 100, only one second traction device 148 may be provided on the second side 134 of the trailing frame portion 120. For example, as shown in FIGS. 5 and 6, only one second traction device 148 is provided on the second side 134 of the trailing frame portion 120 of the machine 100'. The first traction devices 140, 142, 144 and the second traction devices 146, 148, 150 may be, for example, wheels that may be rotatably and independently driven to propel the machine 100 over a ground surface 138 of the worksite 110, although it is possible for the traction devices 140, 142, 144, 146, 148, 150 to include crawler tracks either alone or in conjunction with the wheels.

As shown in FIGS. 3 and 4, the traction devices 140, 142, 144 on the first side 132 of the machine 100 may be linked with the traction devices 146, 148, 150 on the second side 134 of the machine 100 correspondingly by way of fixed axles. For example, the machine 100 may employ fixed axles (152, 154, 156) both at the leading frame portion 118 and the trailing frame portion 120—e.g., a first axle 152 may connect the traction devices 140, 146, a second axle 154 may connect the traction devices 142, 148 and a third axle 156 may connect the traction devices 144, 150. The expression ‘fixed axles’ may mean that the traction devices 140, 142, 144, 146, 148, 150 to any of which a corresponding axle may connect to, may move or rotate (e.g., for achieving machine motion) only about a single axis. Such an axis may be defined along the length of the corresponding axle. In other words, while the traction devices 140, 142, 144, 146, 148, 150 may be rotatable about the axis of the corresponding axle, they may be restricted from tilting with respect to the corresponding axle.

According to some embodiments, at least one electric motor may be coupled to each of the traction devices 140, 142, 144, 146, 148, 150, e.g., for powering a rotation of the traction devices 140, 142, 144, 146, 148, 150 and for moving the machine 100 over the ground surface 138 of the worksite 110. Given six traction devices 140, 142, 144, 146, 148, 150, the machine 100 may include six corresponding electric motors, e.g., the electric motors 170, 172, 174, 176, 178, 180. Out of the six electric motors 170, 172, 174, 176, 178, 180, first electric motors 170, 172, 174 may be correspondingly coupled to the first traction devices 140, 142, 144 and second electric motors 176, 178, 180 may be correspondingly coupled to the second traction devices 146, 148, 150. Such coupling enables the first electric motors 170, 172, 174 to correspondingly drive the first traction devices 140, 142, 144 and the second electric motors 176, 178, 180 to correspondingly drive the second traction devices 146, 148, 150.

The electric motors 170, 172, 174, 176, 178, 180 may convert electrical energy into mechanical rotational energy that is transferred to the corresponding traction devices 140, 142, 144, 146, 148, 150. In some cases, when the trailing frame portion 120 includes only one first traction device 142 and one second traction device 148 (see FIGS. 5 and 6), only two corresponding electric motors 172 and 178 may be required for the respective coupling with the first traction device 142 and the second traction device 148 of the trailing frame portion 120, as shown in FIGS. 5 and 6.

In accordance with various embodiments, the first traction devices 140, 142, 144 may be independently movable of the second traction devices 146, 148, 150 of the machine 100. Further, the first traction devices 140, 142, 144 may be independently movable of each other, as well. Similarly, the second traction devices 146, 148, 150 may also be independently movable of each other. To attain such functionality or independent operation of the traction devices 140, 142, 144, 146, 148, 150, each of the first electric motors 170, 172, 174 and each of the second electric motors 176, 178, 180 may be independently controlled of each other, and they may also be independently controlled amongst themselves. To this end, the first electric motors 170, 172, 174 may respectively drive the first traction devices 140, 142, 144 independently of the second electric motors 176, 178, 180 respectively driving the second traction devices 146, 148, 150. Moreover, the first electric motors 170, 172, 174 may respectively drive the first traction devices 140, 142, 144 independently of each other, as well. Similarly, the second electric motors 176, 178, 180 may also respectively drive the second traction devices 146, 148, 150 independently of each other.

The machine 100 may also include several other parts and sub-systems, such as a power compartment 136. The power compartment 136 may include a power source such as an internal combustion engine or a battery or both, which may produce and supply power to effectuate various functions of the machine 100. Particularly, such a power source may provide electrical power to run the first electric motors 170, 172, 174 and the second electric motors 176, 178, 180 to drive the first traction devices 140, 142, 144 and the second traction devices 146, 148, 150, respectively.

Figure 2:
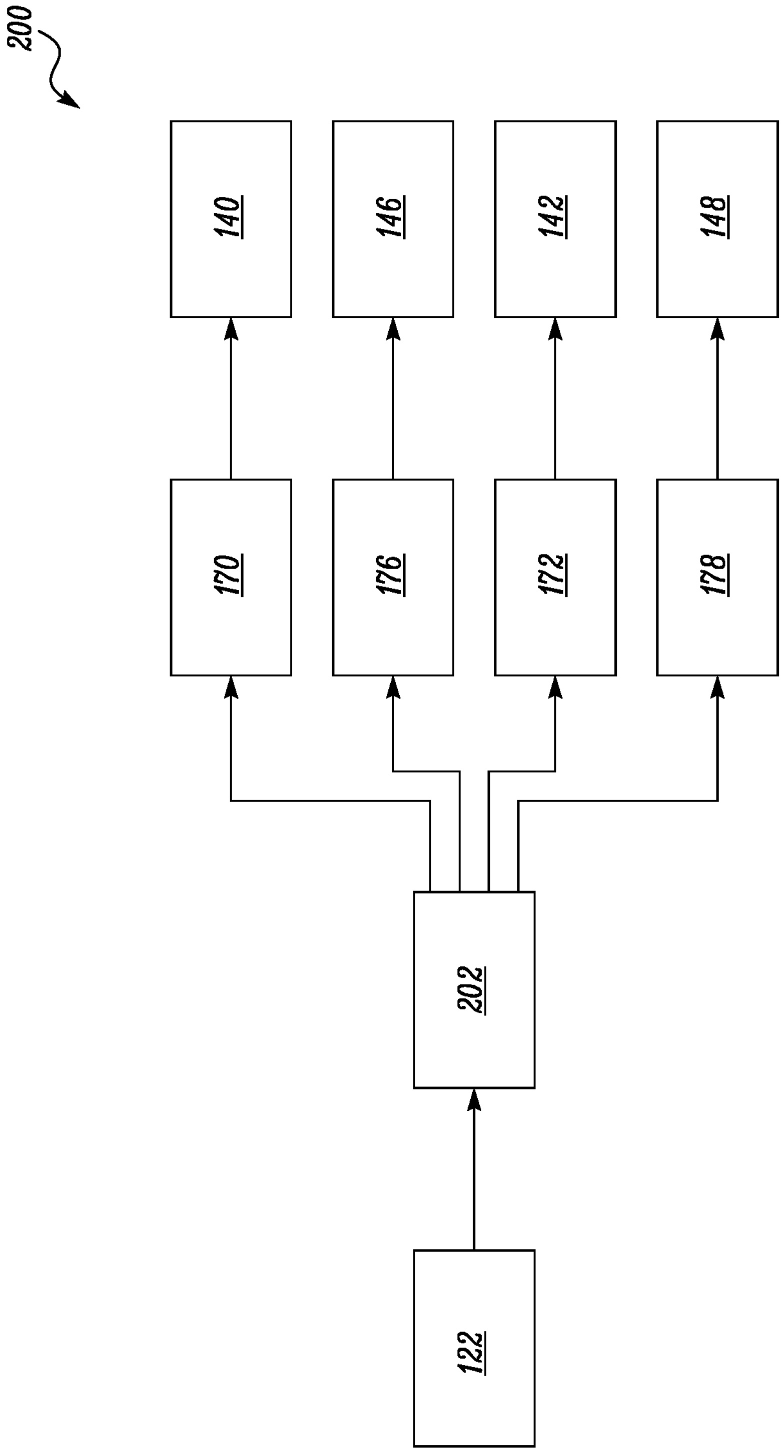
FIG. 2 is a block diagram of the system for steering the articulated machine in different directions, in accordance with an embodiment of the present disclosure.

Referring to FIG. 2, the system 200 is described. The system 200 is configured to selectively steer the machine 100 towards a first side direction 162 (shown in FIGS. 3 and 6) and a second side direction 164 (shown in FIGS. 4 and 5) is described. The first side direction 162 may correspond to the left side direction of the machine 100 and the second side direction 164 may correspond to the right side direction of the machine 100 when viewing the machine 100 from the rearward end 128 towards the forward end 130.

The system 200 may include a controller 202 configured to receive a steering input, for example, from the steering input device 122 of the machine 100. The steering input (e.g., a command) provides an indication of steering angle corresponding to a desired directional movement of the machine 100. The steering input device 122 may include a steering wheel, a dial, a joystick, that is operated by an operator to control the direction of the machine 100. In some embodiments, the steering input device 122 may work in conjunction with a steering device sensor (not shown) that may sense a rotation/position of the steering input device and may provide the corresponding steering input (e.g., a corresponding command) to the controller 202 based on the sensed rotation/position.

The controller 202 is configured to, for at least one of the leading frame portion 118 and the trailing frame portion 120, alter a motion parameter of one of the at least one first traction device (for example, the first traction device 140) and the at least one second traction device (for example, the second traction device 146) with respect to the other of the at least one first traction device and the at least one second traction device to turn one of the leading frame portion 118 and the trailing frame portion 120 with respect to the other of the leading frame portion 118 and the trailing frame portion 120. In some embodiments, as shown in FIGS. 5 and 6, when traction devices 144, 150 are omitted, the controller 202 may be further configured to alter the motion parameter of one of the first traction device 142 and the second traction device 148 with respect to the other of the first traction device 142 and the second traction device 148 to turn one of the leading frame portion 118 and the trailing frame portion 120 with respect to the other of the leading frame portion 118 and the trailing frame portion 120. In so doing, the system 200 enables the machine 100 to achieve steering.

To this end, the controller 202 is configured to control each of the at least one first electric motors (for example, the first electric motor 170) and the at least one second electric motors (for example, the second electric motor 176) to alter the motion parameter of one of the at least one first traction device (for example, the first traction device 140) and the at least one second traction device (for example, the second traction device 146) with respect to the other of the at least one first traction device and the at least one second traction device. In some embodiments, as shown in FIGS. 5 and 6, when traction devices 144, 150 are omitted, the controller 202 may be further configured to control each of the first electric motor 172 and the second electric motors 178 to alter the motion parameter of one of the first traction device 142 and the second traction device 148 with respect to the other of the first traction device 142 and the second traction device 148.

In an embodiment, the controller 202 is configured to alter the motion parameter of one of the at least one first traction device (for example, the first traction device 140) and the at least one second traction device (for example, the second traction device 146) by detecting a stationary state of the machine 100 and reversing a rotational direction of one of the at least one first traction devices and the at least one second traction devices with respect to the other of the at least one first traction device and the at least one second traction device upon detecting the stationary state of the machine 100. The controller 202 may be configured to determine the stationary state of the machine 100, for example, through an accelerometer or engine electronic control module (not shown).

For example, as shown in FIG. 3, to steer the machine 100 towards the first side direction 162 and when the machine 100 is in a stationary state, the controller 202 is configured to power a rotational direction of the second traction device 146 of the leading frame portion 118 in a first rotational direction 210 and power a rotational direction of the first traction device 140 of the leading frame portion 118 in a second rotational direction 212 opposite to the first rotational direction 210. In accordance with various embodiments, the first rotational direction 210 is defined from the trailing frame portion 120 towards the leading frame portion 118 of the machine 100 or may be clockwise when viewing the second side 134. By changing the rotational direction of the first traction device 140 to the second rotational direction 212, the controller 202 enables the second side 134 of the machine 100 to angularly move forward with respect to the first side 132 thereby enabling the steering of the machine 100 towards the first side direction 162. This arrangement enables the turning of the leading frame portion 118 with respect to the trailing frame portion 120, and thus the steering of the machine 100 towards the first side direction 162.

In some embodiments, as shown in FIG. 6, when traction devices 144, 150 are omitted, to steer the machine 100' towards the first side direction 162, the controller 202 may be further configured to power a rotational direction of the first traction device 142 of the trailing frame portion 120 in the first rotational direction 210 (counterclockwise when viewing the first side 132) and/or power a rotational direction of the second traction device 148 of the trailing frame portion 120 in the second rotational direction 212 (clockwise when viewing the second side 134). This arrangement further supplements the steering of the machine 100' towards the first side direction 162.

For example, as shown in FIG. 4, to steer the machine 100 towards the second side direction 164 and when the machine 100 is in a stationary state, the controller 202 is configured to power a rotational direction of the first traction device 140 of the leading frame portion 118 in a first rotational direction 210 and power a rotational direction of the second traction device 146 of the leading frame portion 118 in a second rotational direction 212 opposite to the first rotational direction 210. For example, in this case, the first rotational direction 210 may be counterclockwise when viewing the first side 132. By changing the rotational direction of the second traction device 146 to the second rotational direction 212, the controller 202 enables the first side 132 of the machine 100 to angularly move forward with respect to the second side 134 thereby enabling the steering of the machine 100 towards the second side direction 164. This arrangement enables the turning of the leading frame portion 118 with respect to the trailing frame portion 120, and thus the steering of the machine 100 towards the second side direction 164.

In some embodiments, as shown in FIG. 5, when traction devices 144, 150 are omitted, to steer the machine 100' towards the second side direction 164, the controller 202 is further configured to power a rotational direction of the second traction device 148 of the trailing frame portion 120 in the first rotational direction 210 (clockwise when viewing the second side 134) and/or power a rotational direction of the first traction device 142 (clockwise when viewing the first side 132) of the trailing frame portion 120 in the second rotational direction 212. This arrangement further supplements the steering of the machine 100' towards the second side direction 164.

In another embodiment, to alter the motion parameter of one of the at least one first traction device 140, 142 and the at least one second traction device 146, 148 with respect to the other of the at least one first traction device 140, 142, and the at least one second traction device 146, 148, the controller 202 is configured to change a rotational speed of one of the at least one first traction device 140, 142 and the at least one second traction device 146, 148 with respect to the other of the at least one first traction device 140, 142 and the at least one second traction device 146, 148.

For example, during machine travel exemplarily along direction of travel, T, and when the machine 100 is not in a stationary state, to steer the machine 100 towards the first side direction 162, the controller 202 is configured to increase a rotational speed of the second traction device 146 with respect to the first traction device 140 provided correspondingly at the second side 134 and first side 132 of the leading frame portion 118 and/or decrease a rotational speed of the first traction device 140 with respect to the second traction device 146 provided correspondingly at the first side 132 and second side 134 of the leading frame portion 118. This arrangement enables the turning of the leading frame portion 118 with respect to the trailing frame portion 120, and thus the steering of the machine 100 towards the first side direction 162.

Additionally, in an embodiment, to steer the machine 100 towards the first side direction 162, the controller 202 is configured to decrease a rotational speed of the second traction device 148 with respect to the first traction device 142 provided correspondingly at the second side 134 and first side 132 of the trailing frame portion 120 and/or increase a rotational speed of the first traction device 142 with respect to the second traction device 148 provided correspondingly at the first side 132 and second side 134 of the trailing frame portion 120.

For example, during machine travel exemplarily along the direction of travel, T, to steer the machine 100 towards the second side direction 164, the controller 202 is configured to increase a rotational speed of the first traction device 140 with respect to the second traction device 146 provided correspondingly at the first side 132 and second side 134 of the leading frame portion 118 and/or decrease a rotational speed of the second traction device 146 with respect to the first traction device 140 provided correspondingly at the second side 134 and first side 132 of the leading frame portion 118. This arrangement enables the turning of the leading frame portion 118 with respect to the trailing frame portion 120, and thus the steering of the machine 100 towards the second side direction 164.

Additionally, to steer the machine 100 towards the second side direction 164, the controller 202 is configured to decrease a rotational speed of the first traction device 142 with respect to the second traction device 148 provided correspondingly at the first side 132 and second side 134 of the trailing frame portion 120 and/or increase a rotational speed of the second traction device 148 with respect to the at least one first traction device 142 provided correspondingly at the second side 134 and first side 132 of the trailing frame portion 120.

The controller 202 may be one or more processors, a microprocessor, a microcontroller, an electronic control module (ECM), an electronic control unit (ECU), or any other suitable means for controlling the electric motors 170, 172, 174, 176, 178, 180. The controller may be implemented using one or more controller technologies, such as Application Specific Integrated Circuit (ASIC), Reduced Instruction Set Computing (RISC) technology, Complex Instruction Set Computing (CISC) technology or any other similar technology now known or developed in the future.

INDUSTRIAL APPLICABILITY

During a straight line travel of the machine 100, 100' (e.g., exemplarily along the direction of travel, T,), the leading frame portion 118 is aligned (i.e., in line) with respect to the trailing frame portion 120. However, during a steering of the machine 100 either towards the left side direction of the machine 100, 100' or towards the right side direction of the machine 100, 100', the leading frame portion 118 of the machine 100, 100' may articulate or be pivoted relative to the trailing frame portion 120 of the machine 100, 100'.

With the system 200 of the present disclosure, the pivoting of the leading frame portion 118 relative to the trailing frame portion 120 of the machine 100, 100' can be performed by controlling the electric motors 170, 172, 176, 178 and, more particularly, by suitably altering the motion parameters of the respective traction devices 140, 142, 146, 148 of the leading frame portion 118 and the trailing frame portion 120, as described in detail above. With the employment of electric motors, a need to incorporate a separate system (e.g., an Ackerman steering system or a system dedicated to turn the leading frame portion with respect to the trailing frame portion, such as by hydraulic actuation) to steer the machine 100 is not needed, thus reducing the number of parts (e.g., linkages, fasteners, pumps, cylinders, valves, hoses, fluid reservoirs, etc., as may be commonly found in customary steering systems) in the machine 100 and thus also reducing the bulk and complexity of the machine 100. Moreover, reduced parts commensurately implies reduced cost to produce, procure, and maintain the machine 100.

It will be apparent to those skilled in the art that various modifications and variations can be made to the method and/or system of the present disclosure without departing from the scope of the disclosure. Other embodiments will be apparent to those skilled in the art from consideration of the specification and practice of the method and/or system disclosed herein. It is intended that the specification and examples be considered as exemplary only, with a true scope of the disclosure being indicated by the following claims and their equivalent.

What is claimed is:

1. An articulated machine, comprising:
- a leading frame portion and a trailing frame portion pivotably coupled to each other, each of the leading frame portion and the trailing frame portion defining a first side and a second side opposite to the first side;
- at least one first traction device provided on the first side of each of the leading frame portion and the trailing frame portion, and at least one second traction device provided on the second side of each of the leading frame portion and the trailing frame portion;
- a system to selectively steer the articulated machine towards a first side direction and a second side direction, the system including:
  - a controller configured to:
    - receive a steering input; and
    - for at least one of the leading frame portion and the trailing frame portion, alter a motion parameter of one of the at least one first traction device and the at least one second traction device with respect to the other of the at least one first traction device and the at least one second traction device, to turn one of the leading frame portion and the trailing frame portion with respect to the other of the leading frame portion and the trailing frame portion,
- wherein, to alter the motion parameter of the one of the at least one first traction device and the at least one second traction device with respect to the other of the at least one first traction device and the at least one second traction device, the controller is configured to:
  - detect a stationary state of the articulated machine; and based at least in part upon the detection of the stationary state:

power, in a first rotational direction, one of the at least one first traction device and the at least one second traction device with respect to the other of the at least one first traction device and the at least one second traction device, and power, in a second rotational direction opposite to the first rotational direction, the other of the at least one first traction device and the at least one second traction device while powering the one of the at least one first traction device and the at least one second traction device in the first rotational direction.

2. The articulated machine of claim 1, further including at least one first electric motor to correspondingly drive the at least one first traction device and at least one second electric motor to correspondingly drive the at least one second traction device, wherein the controller is configured to control each of the at least one first electric motor and the at least one second electric motor to alter the motion parameter of one of the at least one first traction device and the at least one second traction device with respect to the other of the at least one first traction device and the at least one second traction device.

3. The articulated machine of claim 1, wherein, to steer the articulated machine towards the first side direction, the controller is configured to power a rotational direction of the at least one second traction device of the leading frame portion in the first rotational direction and power a reverse rotational direction of the at least one first traction device of the leading frame portion in the second rotational direction opposite to the first rotational direction.

4. The articulated machine of claim 3, wherein, to steer the articulated machine towards the first side direction, the controller is configured to at least one of:

power a rotational direction of the at least one first traction device of the trailing frame portion in the first rotational direction; and power a reverse rotational direction of the at least one second traction device of the trailing frame portion in the second rotational direction.

5. The articulated machine of claim 1, wherein, to steer the articulated machine towards the second side direction, the controller is configured to power a rotational direction of the at least one first traction device of the leading frame portion in the first rotational direction and power a reverse rotational direction of the at least one second traction device of the leading frame portion in the second rotational direction opposite to the first rotational direction.

6. The articulated machine of claim 5, wherein, to steer the articulated machine towards the second side direction, the controller is configured to at least one of:

power a rotational direction of the at least one second traction device of the trailing frame portion in the first rotational direction; and power a reverse rotational direction of the at least one first traction device of the trailing frame portion in the second rotational direction.

7. The articulated machine of claim 1, wherein to alter the motion parameter of one of the at least one first traction device and the at least one second traction device with respect to the other of the at least one first traction device and the at least one second traction device, the controller is configured to change a rotational speed of one of the at least one first traction device and the at least one second traction device with respect to the other of the at least one first traction device and the at least one second traction device.

8. The articulated machine of claim 1, wherein, to steer the articulated machine towards the first side direction, the controller is configured to at least one of:

increase a rotational speed of the at least one second traction device with respect to the at least one first traction device provided correspondingly at the second side and first side of the leading frame portion; and decrease a rotational speed of the at least one first traction device with respect to the at least one second traction device provided correspondingly at the first side and second side of the leading frame portion.

9. The articulated machine of claim 8, wherein, to steer the articulated machine towards the first side direction, the controller is configured to at least one of:

decrease a rotational speed of the at least one second traction device with respect to the at least one first traction device provided correspondingly at the second side and first side of the trailing frame portion; and increase a rotational speed of the at least one first traction device with respect to the at least one second traction device provided correspondingly at the first side and second side of the trailing frame portion.

10. The articulated machine of claim 1, wherein, to steer the articulated machine towards the second side direction, the controller is configured to at least one of:

increase a rotational speed of the at least one first traction device with respect to the at least one second traction device provided correspondingly at the first side and second side of the leading frame portion; and decrease a rotational speed of the at least one second traction device with respect to the at least one first traction device provided correspondingly at the second side and first side of the leading frame portion.

11. The articulated machine of claim 10, wherein, to steer the articulated machine towards the second side direction, the controller is configured to at least one of:

decrease a rotational speed of the at least one first traction device with respect to the at least one second traction device provided correspondingly at the first side and second side of the trailing frame portion; and increase a rotational speed of the at least one second traction device with respect to the at least one first traction device provided correspondingly at the second side and first side of the trailing frame portion.

12. The articulated machine of claim 1, wherein the at least one first traction device is movable independently of the at least one second traction device.

* * * * *